US 6,410,891 B1

(12) United States Patent
Muskalla et al.

(10) Patent No.: US 6,410,891 B1
(45) Date of Patent: Jun. 25, 2002

(54) COOKING UNIT, SUCH AS A STOVE, FOR COOKING FOOD

(75) Inventors: Michael Muskalla, Mainz; Bernd Schultheis, Schwabenheim; Werner Hottum, Bechenheim, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/522,460

(22) Filed: Mar. 9, 2000

(30) Foreign Application Priority Data

Mar. 10, 1999 (DE) .......................................... 199 10 467

(51) Int. Cl.[7] ................................................. A21B 1/00
(52) U.S. Cl. .................................. 219/452.11; 126/211
(58) Field of Search ......................... 219/451.1, 452.11, 219/452.12, 460.1, 461.1; 126/39 B, 39 BA, 39 H, 39 N, 39 J, 211

(56) References Cited

U.S. PATENT DOCUMENTS

| 4,363,956 | A | * | 12/1982 | Scheidler et al. | ...... 219/452.12 |
| 4,410,478 | A | * | 10/1983 | Lindenmayer et al. | ...... 264/248 |
| 4,453,533 | A | * | 6/1984 | Scheidler et al. | ...... 219/452.12 |
| 4,963,413 | A | * | 10/1990 | Amano | ...... 429/192 |
| 4,996,808 | A | * | 3/1991 | Weaver | ...... 52/208 |
| 5,357,080 | A | * | 10/1994 | Vetter et al. | ...... 219/445.1 |
| 5,432,320 | A | * | 7/1995 | Scheidler et al. | ...... 219/445.1 |
| 5,655,489 | A | * | 8/1997 | Kammerer et al. | ...... 123/90.38 |
| 5,768,979 | A | * | 6/1998 | Antoine | ...... 126/39 B |
| 5,785,047 | A | * | 7/1998 | Bird et al. | ...... 126/39 H |
| 5,844,206 | A | * | 12/1998 | Steiner et al. | ...... 219/452.12 |
| 6,002,112 | A | | 12/1999 | Nass et al. | |
| 6,021,774 | A | | 2/2000 | Taplan et al. | |
| 6,085,643 | A | * | 7/2000 | Stedron | ...... 99/422 |
| 6,111,229 | A | | 8/2000 | Schultheis | |

FOREIGN PATENT DOCUMENTS

| DE | 3110087 | 9/1982 |
| DE | 3341210 | 5/1985 |
| DE | 19525825 | 1/1997 |
| DE | 19612621 | 10/1997 |
| DE | 19615371 | 10/1997 |
| DE | 19649767 | 6/1998 |
| DE | 19703542 | 8/1998 |
| EP | 0407797 | 1/1991 |
| EP | 0754532 | 1/1997 |
| EP | 0785058 | 7/1997 |

* cited by examiner

Primary Examiner—Sang Paik
(74) Attorney, Agent, or Firm—Nils H. Ljungman & Associates

(57) ABSTRACT

A cooking unit, such as a stove, for cooking food, which cooking unit may have a cooking hob and cooking elements associated therewith; a mounting and a method of manufacture for a mounting; and a method of manufacture for a cooking unit, such as a stove, for cooking food, which cooking unit may have a cooking hob and cooking elements associated therewith.

4 Claims, 3 Drawing Sheets

41

COOKING UNIT, SUCH AS A STOVE, FOR COOKING FOOD

BACKGROUND OF THE INVENTION

1. Field of the Invention

The present invention may relate to a cooking unit, such as a stove, for cooking food, which cooking unit may have a cooking hob and cooking elements associated therewith.

2. Background Information

U.S. Pat. No. 6,021,774 relates generally to a unit with at least one plate made of a material which is permeable to thermal radiation, such as glass ceramic glass, ceramic or a similar material, as a surface for cooking, frying and/or keeping warm. The unit is positioned on a frame construction and has different types of adjustable heat sources distributed underneath and on the plate. Some of the heat sources are distributed under the plate in the form of radiant burners and act indirectly by radiation through the plate. Other heat sources are located above-the level of the plate in the form of open atmospheric or atmospheric pressure gas burners and transmit heat directly by producing open flames. The respective heat sources correspond to the cooking, frying and/or warming positions.

U.S. Pat. No. 6,002,112 relates to a cooking appliance with a hob having a plurality of cooking rings, at least one of which cooking rings is designated as a rapid cooking ring. The cooking rings can be heated essentially by electrically operated heating devices, and the rapid cooking ring is formed by a hot plate integrated into the hob.

U.S. patent application Ser. No. 09/177,336, allowed on Oct. 25, 1999, relates to an arrangement of an electrical heating element as a cooking zone, having as a carrier a ceramic of very high thermal conductivity, in a cutout of a cooking surface comprising glass-ceramic, glass, ceramic, metal or plastic. The ceramic carrier of the heating element has, above the plane of the cooking surface, a region, by means of which region the carrier engages over the cutout onto the top of the cooking surface and by means of which region the carrier rests on the cooking surface by a gasket. The ceramic carrier forms, in the plane of the cooking surface, a further region, by which further region the carrier is positioned in the cutout at a distance from the end faces of the latter, and, below the plane of the cooking surface, a region having shaped-out portions serves as a bearing for an element which element, with the aid of the cooking surface as an abutment, fixes the heating element in the cutout of the cooking surface.

A mounting is described in German Patent No. 197 03 541 A1, for example. This publication describes a frame which, in one preferred embodiment, surrounds a cooking surface on its upper and-lower sides, whereby the frame is connected in an interlocking manner with a supporting segment which is engaged underneath the cooking surface on its underside.

The frame has a porous surface, i.e., one that accumulates dirt. Ordinary household cleaners and other particles of dirt accumulate in the pores and thus result in a permanent, often unsightly contamination. The frame can easily be damaged by mechanical and thermal loads.

German Patent No. 195 25 825 A1 describes a method for the manufacture of an oven cooktop and an oven cooktop that is manufactured using this method. In this method, a plate and a profile that forms at least the surface are connected to each other in an interlocking manner, whereby the lining completely surrounds the edge of the plate in the shape of a C. Because the plate extends beyond the cooking surface into the peripheral area of the cooktop, and is thus exposed without protection to external influences, in this case it is necessary to also use a profile that protects the plate.

German Patent No. 196 12 621 A1 also describes a cooktop with a cooking surface, with at least one function zone, whereby the function zone is incorporated into the cooking surface by means of a tight joint that retains its elasticity. The cooking surface and function zone are thereby connected to each other only by means of their end surfaces.

OBJECT OF THE INVENTION

One possible object of the present invention may be to find a method for the manufacture of a mounting for essentially flat cooking surfaces, whereby the mounting may surround the cooking surfaces at least in the bottom and lateral peripheral area.

SUMMARY OF THE INVENTION

The method must be essentially simple, involve only a few steps, and have an essentially high degree of automation and essentially good process control. It must also be possible to adapt the method essentially quickly, easily and flexibly to different cooking surface geometries.

One possible purpose of the method may be to directly connect the mounting and one or more cooking surfaces with one another.

An additional object of the present invention may be to create a mounting for corresponding cooking surfaces. In at least one possible embodiment of the present invention, it must be possible to shape the mounting directly on the cooking surface. If necessary, the mounting preferably should have an edge-protector for the cooking surface and possibly an assembly aid to facilitate the installation of the cooking surface, whereby the mounting should have a smooth, closed surface that is essentially easy to clean. The cooking surface must be essentially protected against dirt and mechanical loads. It must be possible to manufacture the cooking surface essentially easily, quickly and with consistently high quality.

In at least one possible embodiment of the present invention, the mounting preferably also surrounds a cooking surface or a plurality of cooking surfaces and connect them essentially firmly to one another.

The mounting claimed by the present invention preferably forms an essentially effective, permanent edge protector for the cooking surface in the particularly sensitive area of its lateral edge.

A particularly good connection between the mounting and the cooking surface may be achieved, for example, by a connection in the shape of a C with the lateral edge of the cooking surface. The deformation of the shaped lateral edge of the cooking surface by the mounting essentially prevents the cooking surface from being pushed out of the mounting under load.

On account of the arrangement of the mounting's being essentially flush with the cooking surface, its essentially good mechanical properties (smoothness, non-porosity, flexibility), its resistance to conventional mechanical loads, e.g., when cooking implements are pulled over the mounting, is also essentially guaranteed.

In other words, in at least one possible embodiment of the present invention, because the mounting may be essentially level or flush with the cooking surface or cooking structure, the mounting may exhibit essentially good mechanical properties, such as, for example, smoothness, non-porosity, flexibility, and resistance to conventional mechanical loads, such as, for example, a cooking implement that is being pulled or otherwise moved over the mounting.

The method may make possible the essentially economical manufacture of a cooking surface with an essentially effective mounting which also integrates essentially effective edge protection and, if appropriate, an assembly aid embedded in a supporting segment of the mounting. With this method, it may be possible to manufacture a mounting, ready for installation, for a cooking surface using only a few process steps.

The essential ease of using cavity plates that are adapted to the geometry of the mounting may be further evidence of the essentially advantageous flexibility of the method. To connect a specific cooking surface with a specific mounting in at least one possible embodiment of the present invention, all that may be necessary may be to change the cavity plates.

For example, it may be essentially advantageous that the mounting, in at least one possible embodiment of the present invention, preferably is molded directly onto a plurality of cooking surfaces and connects the cooking surfaces to one another. In this case, the mounting may surround not only one single cooking surface, but a plurality of cooking surfaces simultaneously. It thereby may become possible, for example, to arrange a plurality of cooking surfaces next to one another and to connect them firmly to one another by means of the mounting claimed by the present invention.

It may also be essentially advantageous that the assembly aid may project at a right angle from the holding. The installation thereby may become particularly easy, because the matching elements to which the assembly aid, and thus the cooking surface provided with the mounting, may or must be fastened are generally oriented at a right angle to the cooking surface. The assembly aid is preferably configured so that it can be essentially easily inserted into a matching element that may be realized in the form of a locking receptacle.

The locking element to hold the assembly aid can, for example, be a montage frame that may be connected directly with a cutout in a work surface, so that the molding can be installed easily simply by latching the cooking surface provided with the mounting.

An additional advantage that may be taught by the present invention is that the assembly aid may have an anchoring means. An essentially permanent positive and non-positive connection between the supporting segment of the mounting and the assembly aid may thereby be essentially guaranteed. The interlocking fit between the mounting and the assembly aid can thereby be created in a number of different ways. For example, the anchoring can have ribs that are embedded in the supporting segment, and/or the anchoring means can be provided with openings that are surrounded by the mounting. Finally, the assembly aid can have a bent section, by means of which it may be anchored in the mounting.

For a secure fixing of the assembly aid in position, the anchoring means preferably run at right angles to the direction of the main load acting on the assembly aid, and in the case of a assembly aid that projects at right angles to the cooking surface, for example, the anchoring means may preferably run parallel to the cooking surface.

In at least one possible embodiment of the present invention, the assembly aid is preferably made of metal.

In at least one possible embodiment of the present invention, the cooking surface is preferably made of glass.

Cooking surfaces made of the materials listed above can be permanently connected with a mounting in at least one possible embodiment of the present invention, and their edges can thereby be essentially effectively protected.

The mounting may surround with particular advantage at least one cooking surface and one function zone, whereby the cooking surface and the function zone can be made of different materials. Thus parts of the molding that have different functions may be surrounded by the mounting and may be connected by it. For example, a function zone can be a cooking surface that has control and/or display functions. A function zone can also essentially easily be used as an area to put down cooking implements or as a warming area.

The mounting preferably forms the bottom and lateral framing, ready for installation, of the cooking surface and/or of the function zone. There may no longer be any need for conventional metal and/or plastic frames, because the mounting may replace current frames on account of its properties as described above.

The mounting preferably surrounds cooking areas, e.g., made of glass ceramic, cooking zones, e.g., made of ceramic, hob tops, e.g., made of DURAX (a registered trademark), refrigerator shelves, and view windows, display glass panels, and partitions for ovens or refrigerators, e.g., for a Cook-In (a registered trademark).

A further possible advantage of the method may be that a plurality of cooking surfaces can be simultaneously provided with a mounting and can be connected with each other by means of the mounting.

The above-discussed embodiments of the present invention will be described further hereinbelow with reference to the accompanying figures. When the word "invention" is used in this specification, the word "invention" includes "inventions", that is, the plural of "invention". By stating "invention", Applicants do not in any way admit that the present application does not include more than one patentably and non-obviously distinct invention, and maintain that this application may include more than one patentably and non-obviously distinct invention. Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the exemplary embodiments illustrated in the accompanying drawings, in which.

DESCRIPTION OF THE PREFERRED EMBODIMENT

Figure 1:
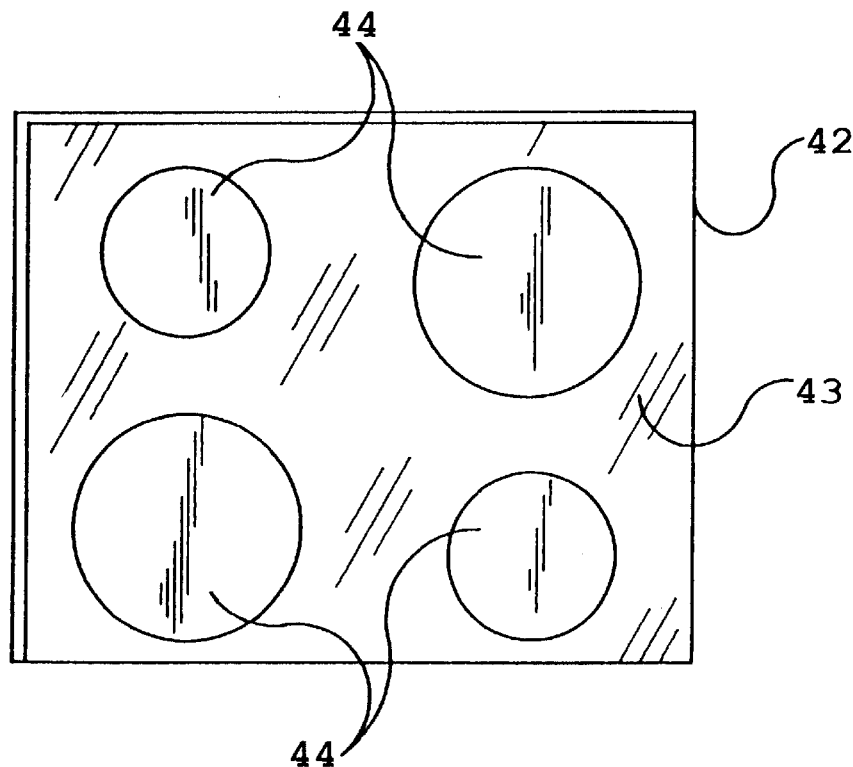
FIG. 1 is a diagrammatic top view of an arrangement of a cooking hob.

FIG. 1 is a diagrammatic top view of an arrangement of a cooking hob 42, showing heating elements, burners, burner structures, or cooking elements 44 and a molding or cooking surface 43.

Figure 2:
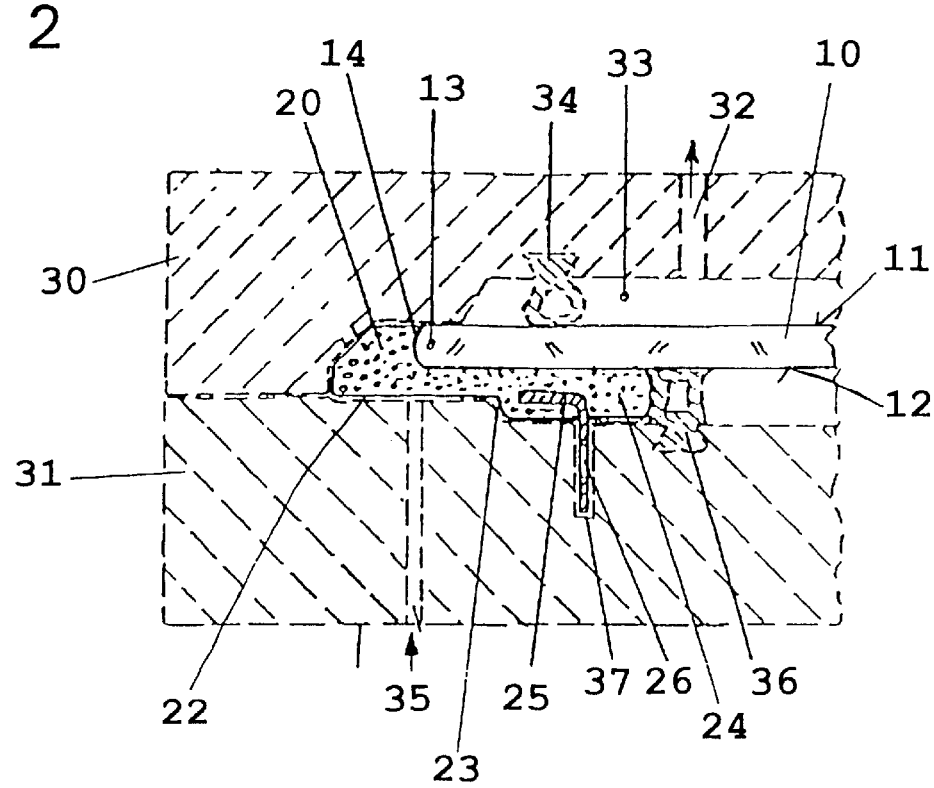
FIG. 2 is a side view of part of a flat cooking surface with a mounting, in cavity plates.

FIG. 2 shows cavity plates that consist of a mold top part and a mold bottom part 31. The cavity plates are illustrated in broken lines, to more clearly show the mounting 20 claimed by the present invention and the cooking surface 10. The mold top part 30 has a bearing section, with which it rests on the upper side 11 of the cooking surface 10 in the vicinity of the edge 13.

In the remaining portion of the cooking surface 10, the cavity retaining plate is set back with respect to the upper side 11, so that there is a vacuum chamber 33. Toward the bearing surface, the vacuum chamber 33 is sealed by means of a seal element. A vacuum pump can be connected to a channel 32 of the mold top part 30. The channel 32 is in communication with the vacuum chamber 33. When the pressure in the vacuum chamber 33 is reduced by means of the vacuum pump, the cooking surface 10 may be pulled against the bearing surface, and is thereby fixed in position in the mold 30, 31.

As shown in FIG. 2, there is a support arrangement 34 associated with the vacuum chamber 33, which support arrangement 34 may connect to or be adjacent to the cooking surface or cooking surface structure 10.

The mold bottom part 31 is located under the underside 12 of the cooking surface 10. The mold bottom part 31 is supported against the underside 12 with an elastic mold piece 36. Toward the edge 13 of the cooking surface 10, at some distance from the mold piece 36, the mold bottom 31 has a receptacle 37. An assembly aid 26 can be inserted in this receptacle 37. The liquid silicone rubber can be injected by means of an injection channel 35. The liquid silicone rubber may consist of two components that are mixed before they enter the injection channel 35.

The assembly aid 26 has a segment 25 that extends into the mounting 20.

Thus, for example, the liquid silicone rubber can be injected using an injection molding machine and the Liquid Injection Molding (LIM) process. In this process, the liquid silicone rubber may be injected at a pressure within a range of approximately 100 bar to approximately 200 bar and at a temperature within a range of approximately 20 degrees Celsius to approximately 30 degrees Celsius. After the liquid silicone rubber has been injected, it may be crosslinked at a temperature within a range of approximately 140 degrees Celsius to approximately 200 degrees Celsius, whereby the crosslinking time (vulcanization time) is preferably within a range of approximately 3 seconds to approximately 7 seconds per millimeter of wall thickness of the mounting 20. During the vulcanization, the pressure in the interior of the mold can increase to up to approximately 400 bar.

The vulcanized silicone rubber, together with the assembly aid 26, forms the mounting 20 which surrounds the edge 13 of the cooking surface 10.

The mounting 20 has a supporting segment 24 which is engaged underneath the cooking surface on its underside 12. The assembly aid 26 is embedded with an anchoring in this supporting segment 24. The supporting segment 24 transitions via a shoulder 23 into a contact surface 22. The mounting 20 can be fixed in position in an opening of a work surface by means of the contact surface 22.

As FIG. 2 also shows, the edge 13 of the cooking surface 10 is rounded and has a C-profile or C-shaped profile. As a result, a draft 14 is formed. The draft 14 is backfilled with the silicone rubber, so that an undercut is formed. This undercut represents an interlocking fit between the cooking surface 10 and the mounting 20, and may ensure the proper adherence of the silicone rubber to the cooking surface 10 so that the cooking surface 10 essentially cannot be pushed out of the mounting 20 by an excessive load.

Figure 3:
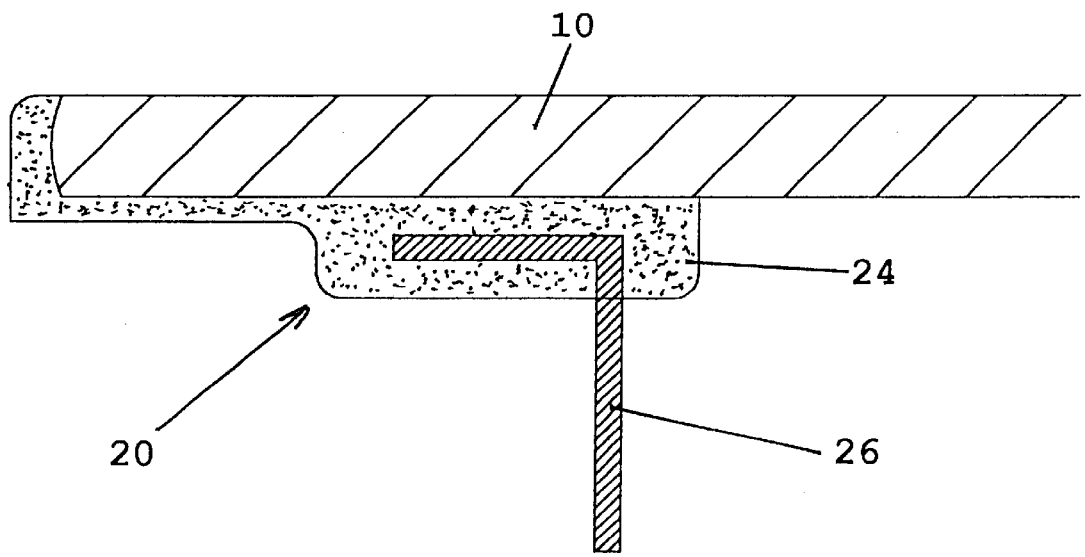
FIG. 3 is a side view of part of one possible realization of a mounting.

FIG. 3 shows an additional variant embodiment of a mounting 20. The mounting 20 shown in FIG. 3, like the mounting 20 illustrated in FIG. 2, has one or more assembly aids 26. Fastened to these assembly aids 26 are installation units which are not shown in the figure to keep the drawing essentially simple and easier to understand. The installation units can be used to hold heating bodies, for example.

Figure 4:
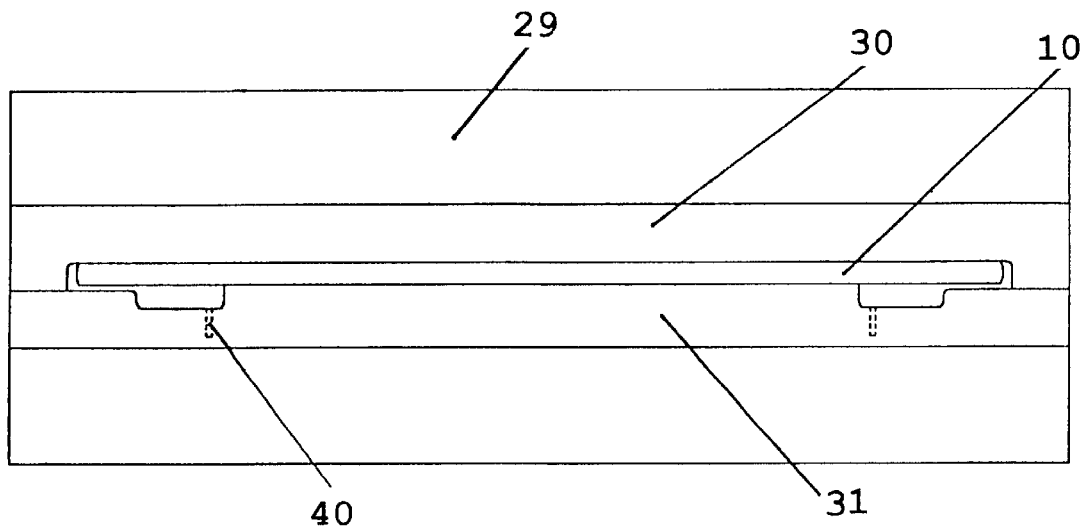
FIG. 4 is a side view of a cooking surface in an injection mold with cavity plates.
Figure 5:
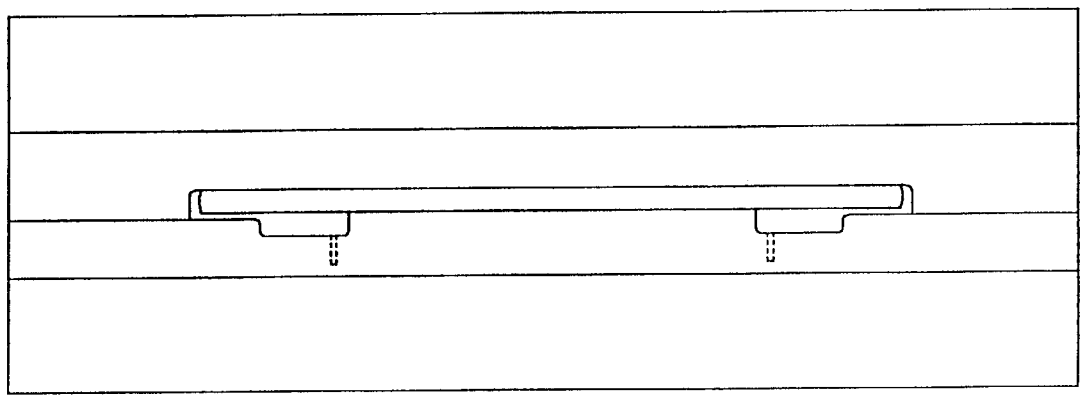
FIG. 5 is an illustration of an additional possible configuration like the one illustrated in FIG. 3.

FIGS. 4 and 5 are schematic illustrations of two injection molds 29. A cooking surface 10 that has been inserted in the cavity retaining plates 30, 31 is also shown. The cavity retaining plates 30, 31 are distinguished by their different geometry, which is adapted to the shape of the cooking surface 10. To connect a defined cooking surface 10 with a defined mounting 20, in at least one possible embodiment of the present invention, all that may be necessary may be to change the cavity retaining plates 30, 31.

As shown in FIG. 4, associated with the cooking surface 10 is an assembly or mounting aid or arrangement 40.

Figure 6:
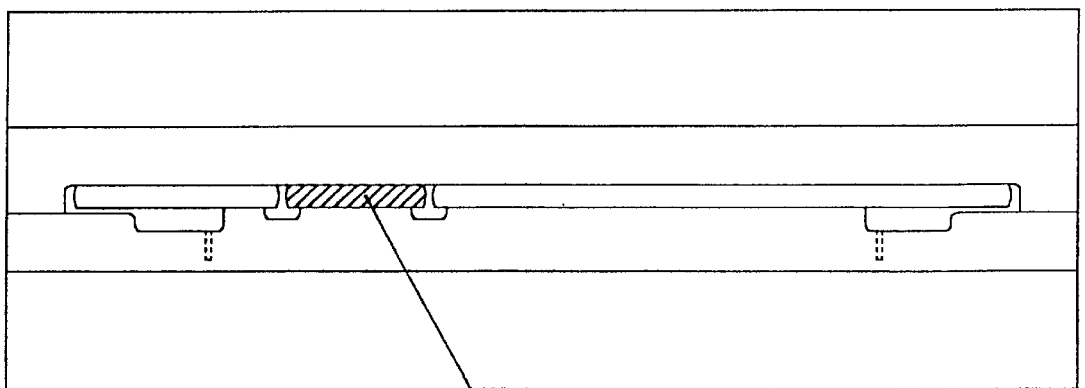
FIG. 6 is a side view of two cooking surfaces with a mounting in an injection mold with cavity plates.

FIG. 6 shows an injection mold 29. The drawing shows a cooking surface 10 (shown in FIG. 4) that has been inserted into the cavity retaining plates 30, 31 (shown in FIG. 4) and a function zone 41. The bottom cavity retaining plate 31 thereby has a geometry that is adapted both to the cooking surface 10 and to the function zone 41. The vulcanized silicone rubber that is injected into the cavities of the cavity retaining plates 30, 31, together with the assembly aid 26 (shown in FIG. 3), forms the mounting 20 (shown in FIG. 3) which surrounds the edge of the cooking surface 10 and of the function zone 41. Simultaneously, the cooking surface 10 and the function zone 41 are essentially firmly connected to each other. The different moldings 10 can thereby be arranged in any desired relationship to one another, whereby the geometry of the cavity retaining plates 30, 31 and the geometry and arrangement of the moldings 10 with respect to one another determines the geometry of the mounting 20.

Preferably, at least one function element, function arrangement, or function zone 41 is incorporated in a recess of the cooking surface 10, and is essentially firmly connected to the cooking surface 10 by means of the mounting 20 in at least one possible embodiment of the present invention.

In an Additional configuration of the present invention, the moldings 10 may be surrounded only partly by the mounting 20. Thus, for example, a function zone 41 can be integrated into the recess of the cooking surface 10 by means of the mounting 20, without the cooking surface 10's simultaneously being completely surrounded by the mounting 20.

It is also possible to provide moldings 10 that are not flat with a mounting 20 in at least one possible embodiment of the present invention, by means of an appropriate adaptation of the cavity retaining plates 30, 31. Cooking surfaces that are not flat are described, for example, in German Unexamined Patent Application DE 43 33 334 A1.

The two-component liquid silicone rubber is preferably SILOPREN (a registered trademark) manufactured by GE Bayer Silicones, used in an injection molding machine manufactured by KLOCKNER DESMA Elastomertechnik, to connect a CERAN (a registered trademark) or DURAX (a registered trademark) cooking surface with a mounting in at least one possible embodiment of the present invention.

The present invention may relate to a mounting and a method for manufacturing a mounting for essentially flat surfaces for cooking, whereby the mounting may surround the cooking surfaces at least in the lower and lateral peripheral area.

The present invention may relate to a mounting and a method for manufacturing a mounting for essentially flat moldings that are made of brittle material, whereby the mounting surrounds the moldings at least in the lower and lateral peripheral area.

A mounting of this type is described in German Patent No. 197 03 541 A1, for example. This publication describes a frame which is formed from temperature-resistant plastic reaction foam and is formed onto a cooking surface. In one preferred embodiment, the frame surrounds the cooking surface on its upper and lower sides, whereby the frame is connected in an interlocking manner with a supporting segment which is engaged underneath the cooking surface on its underside.

The foamed-on plastic has a porous surface, i.e., one that accumulates dirt. Ordinary household cleaners and other particles of dirt accumulate in the pores and thus result in a permanent, often unsightly contamination. In addition, with some of the plastics cited in German Patent No. 197 03 542 A1, the surface is too soft and the temperature resistance too low. The frame can easily be damaged by mechanical and thermal loads.

An additional disadvantage is the generally long curing time of plastic reaction foams in the mold, which does not promote the objective of reduced manufacturing times.

For moldings made of brittle material, German Patent No. 196 51 371 A1 describes the use of silicone rubber as a shrinkable and temperature-resistant material.

A system for the attachment of glass ceramic cooking surfaces with a peripheral area that tapers in the form of a thin edge to a work surface is described in German Patent No. 196 49 767 A1, whereby the lower and lateral peripheral area of the cooking surface is made of a material of medium hardness, e.g., silicone rubber, which is vulcanized or sprayed directly onto the cooking surface.

A seal of the known art that is non-detachably connected to the glass ceramic cooking plate and is connected with the cooking plate on its lower and lateral peripheral area is described in German Patent No. 31 10 087 C2. The seal, which can be made of heat-resistant silicone, for example, and is sprayed onto the cooking plate is directly connected with connecting elements that are located in the lower portion of the cooking plate.

German Patent No. 195 25 825 A1 describes a method for the manufacture of an oven cooktop and an oven cooktop that is manufactured using this method. In this method, a glass ceramic plate and a metal profile that forms at least the surface are connected to each other in an interlocking manner by means of injection molding directly in an injection mold, whereby the plastic lining completely surrounds the edge of the plate in the shape of a C. Because the plastic extends beyond the cooking surface into the peripheral area of the cooktop, and is thus exposed without protection to external influences, in this case it is necessary to also use a metal profile that protects the plastic.

German Patent No. 196 12 621 A1 also describes a cooktop with a cooking surface that is made of glass and/or glass ceramic, with at least one function zone, whereby the function zone is also made of glass and/or class ceramic and is incorporated into the cooking surface by means of a tight, temperature-resistant joint that retains its elasticity. The cooking surface and function zone are thereby connected to each other only by means of their end surfaces.

One possible object of the present invention may be to find a method for the manufacture of a mounting for essentially flat moldings made of brittle material, whereby the mounting may surround the moldings at least in the bottom and lateral peripheral area.

The method must be essentially simple, involve only a few steps, have an essentially high degree of automation and essentially good process control, and it must also be possible, in at least one possible embodiment of the present invention, to adapt the method essentially quickly, easily and flexibly to different molding geometries.

One purpose of the method, in at least one possible embodiment of the present invention, preferably is to directly connect the mounting and one or more moldings with one another.

A possible additional object of the present invention may be to create a mounting for corresponding moldings. It may or must be possible, in at least one possible embodiment of the present invention, to shape the mounting directly on the molding. If necessary, the mounting should have an edge-protector for the molding and possibly an assembly aid to facilitate the installation of the molding, whereby the mounting should have a smooth, closed surface that is easy to clean. In at least one possible embodiment of the present invention, the mounting preferably must be essentially resistant to the temperatures that are typically encountered in domestic use, and preferably must be protected against dirt and mechanical loads. It preferably is possible, in at least one possible embodiment of the present invention, to manufacture the mounting essentially easily, quickly and with essentially consistently high quality.

In at least one possible embodiment of the present invention, the mounting preferably also surrounds a molding or a plurality of moldings and connects them essentially firmly to one another.

In at least one possible embodiment, the present invention preferably teaches that at least one possible object specified above can be accomplished by the following steps:

Inserting and positioning the molding in a heatable injection mold with at least two cavity plates of a specified shape, whereby the specified shape of the cavity plates determines the shape and orientation of the mounting with respect to the molding;

Closing the injection mold;

Injecting addition-crosslinkable (hot-curable) two-component liquid silicone rubber under pressure;

Hot vulcanizing the liquid silicone rubber, whereby the mounting formed from the silicone rubber may be directly connected with the molding at least in the bottom and lateral peripheral area; and Unmolding the molding that has been directly connected with the mounting.

In at least one possible embodiment, with regard to the mounting, the present invention preferably teaches that the mounting is formed from temperature-resistant, addition-crosslinked (hot cured), injection molded, two-component silicone rubber, whereby the mounting is sprayed directly onto the molding and is connected with it.

The mounting, in at least one possible embodiment of the present invention, preferably forms an essentially effective, permanent edge protector for the molding in the particularly sensitive area of its lateral edge.

A particularly good connection between the mounting and the molding may be achieved, for example, by a connection in the shape of a C with the lateral edge of the cooking surface. In addition to the good adhesion of the hot-vulcanized silicone rubber, the deformation of the shaped lateral edge of the molding by the mounting may essentially prevent the molding from being pushed out of the mounting under load.

The mounting may have the possibly required essentially smooth, non-porous surface, so that cleaning agents and, for example, the type of dirt encountered during domestic cooking essentially cannot penetrate the surface and also essentially does not adhere to the surface. The sensitivity to staining may be reduced essentially to a minimum, compared to mountings of the known art.

The mounting also may have the temperature stability required in certain domestic applications.

On account of the arrangement of the mounting essentially flush with the surface of the molding, its essentially excellent surface properties and its essentially good mechanical properties (smoothness, non-porosity, flexibility), its resistance to conventional mechanical loads, e.g., when cooking implements are pulled over the mounting, may also be essentially guaranteed.

In at least one possible embodiment of the present invention, the method preferably makes possible the essentially economical manufacture of a molding with an essentially effective mounting which also integrates essentially effective edge protection and, if appropriate, an assembly aid embedded in a supporting segment of the mounting. With this method, it may be possible to manufacture a mounting, ready for installation, for a molding using only a few process steps.

The method can be carried out using conventional injection molding machines and injection molds that are themselves known.

Conventional injection molding machines have an essentially high degree of automation and an essentially effective process control, which may represent essential advantages in terms of the method in at least one possible embodiment of the present invention.

The implementation of the method, in at least one possible embodiment of the present invention, in existing high-capacity injection molding machines with a retrofit kit may make possible the essentially rapid and economical manufacture of the mounting.

The essential ease of using cavity plates that are adapted to the geometry of the mounting is further evidence of the essentially advantageous flexibility of the method. To connect a specific cooking surface with a specific mounting, all that may be necessary may be to change the cavity plates.

For example, it may be essentially advantageous that the mounting, in at least one possible embodiment of the present invention, may be injection molded directly onto a plurality of moldings and may connect the moldings to one another. In this case, the mounting may surround not only one single molding, but a plurality of moldings simultaneously. It thereby may become possible, for example, to arrange a plurality of moldings next to one another and to connect them essentially firmly to one another by means of the mounting.

It may also be essentially advantageous that the assembly aid, in at least one possible embodiment of the present invention, preferably projects at a right angle from the holding. The installation thereby becomes particularly easy because the matching elements to which the assembly aid, and thus the molding provided with the mounting, must be fastened may be generally oriented at a right angle to the molding. The assembly aid is preferably configured so that it can be essentially easily inserted into a matching element that may be realized in the form of a locking receptacle.

The locking element to hold the assembly aid can, for example, be a montage frame that is connected directly with a cutout in a work surface, so that the molding can be installed essentially easily simply by latching the molding provided with the mounting.

An additional advantage preferably taught by at least one possible embodiment of the present invention may be that the assembly aid has an anchoring means. An essentially permanent positive and non-positive connection between the supporting segment of the mounting and the assembly aid may thereby be essentially guaranteed. The interlocking fit between the mounting and the assembly aid can thereby be created in a number of different ways. For example, the anchoring can have ribs that are embedded in the supporting segment, and/or the anchoring means can be provided with openings that may be surrounded by the silicone rubber of the mounting. Finally, the assembly aid can have a bent section, by means of which it may be anchored in the silicone rubber.

For an essentially secure fixing of the assembly aid in position, the anchoring means preferably run at right angles to the direction of the main load acting on the assembly aid, and in the case of a assembly aid that projects at right angles to the molding, for example, the anchoring means parallel to the molding.

In at least one possible embodiment of the present invention, the assembly aid is preferably made of metal.

In at least one possible embodiment of the present invention, the molding is preferably made of glass, in particular soda-lime glass, borosilicate glass, or alumosilicate glass, whereby the glass is preferably prestressed, or of glass ceramic or ceramic, in particular ceramic that contains SiC or silicon carbide, $Si_3N_4$ or silicon nitrate, and/or $Al_2O_3$ or aluminum oxide. Moldings made of the materials listed above can be essentially permanently connected with a mounting, and their edges can thereby be effectively protected.

The mounting may surround with particular advantage at least one cooking surface and one function zone, whereby the cooking surface and the function zone can be made of different brittle materials. Thus parts of the molding that have different functions may be surrounded by the mounting and may be connected by it. For example, a function zone can be a molding that has control and/or display functions. A function zone can also essentially easily be used as an area to put down cooking implements or as a warming area.

In at least one possible embodiment of the present invention, the mounting preferably forms the bottom and lateral framing, ready for installation, of the cooking surface and/or of the function zone. There may no longer be any need for conventional metal and/or plastic frames, because the mounting may replace current frames on account of its properties as described above.

In at least one possible embodiment of the present invention, the mounting preferably surrounds cooking areas, e.g., made of glass ceramic, cooking zones, e.g., made of ceramic, hob tops, e.g., made of DURAX (a registered trademark), refrigerator shelves, or view windows, display glass panels, and partitions for ovens or refrigerators, e.g., for a Cook-In (a registered trademark).

In at least one possible embodiment of the present invention, the liquid silicone rubber is preferably injected into the closed injection mold using an injection molding machine and the Liquid Injection Molding (LIM) process or a liquid injection molding process.

The use of existing injection molding machines and injection molding methods of the known art may also result in the advantages described above. However, the present invention may not be restricted to the use of existing injection molding machines and methods.

In at least one possible embodiment of the present invention, the liquid silicone rubber is preferably injected at a temperature within a range of 100 bar to 200 bar at a temperature within a range of approximately 20 degrees Celsius to approximately 30 degrees Celsius. The liquid silicone rubber may then be cross-linked, preferably at a temperature within a range of approximately 140 degrees Celsius to approximately 200 degrees Celsius. The crosslinking time (curing time) may advantageously be within the range of approximately 3 seconds per millimeter of wall thickness of the mounting to approximately 7 seconds per millimeter of wall thickness of the mounting.

A further possible advantage of the method may be that a plurality of moldings can be simultaneously provided with a mounting and can be connected with each other by means of the mounting.

The above-discussed embodiments of the present invention will be described further herein with reference to the accompanying figures. When the word "invention" is used in this specification, the word "invention" includes "inventions", that is, the plural of "invention". By stating "invention", Applicants do not in any way admit that the present application does not include more than one patentably and non-obviously distinct invention, and maintain that this application may include more than one patentably and non-obviously distinct invention. Applicants hereby assert that the disclosure of this application may include more than one invention, and, in the event that there is more than one invention, that these inventions may be patentable and non-obvious one with respect to the other.

As used in this application, the word "major appliance" may mean, for example, at least one of "refrigerator", "oven", or "stove".

As used in this application, the word "molding" may mean, for example, "cooking surface" and/or "cooking surface structure".

One feature of the invention resides broadly in a stove for cooking food, said stove comprising: a stove body; a cooking hob, said cooking hob comprising at least one cooking surface structure to receive a bottom of a cooking utensil; said cooking hob further comprising at least one cooking element; said at least one cooking surface structure being disposed adjacent said at least one cooking element; said cooking hob further comprising a substantially planar area being disposed about said at least one cooking element; a mounting structure being configured to mount said at least one cooking surface structure; said mounting structure being disposed to surround said at least one cooking surface structure at least in the lower and peripheral area of said at least one cooking surface structure; said mounting structure comprising a molding arrangement injected directly about said at least one cooking surface structure; said mounting structure comprising rubber in contact with said at least one cooking surface structure; and said mounting structure being connected to said cooking hob to hold said at least one cooking surface structure on said cooking hob.

Another feature of the invention resides broadly in the stove, wherein the mounting structure further comprises: at least one support arrangement disposed generally under said mounting structure; said at least one support arrangement is disposed to support said mounting structure; at least one assembly arrangement for facilitating mounting of said mounting structure; and said at least one assembly arrangement is at least partly disposed in and non-detachably connected to said at least one support arrangement.

Yet another feature of the invention resides broadly in the stove, wherein: said at least one assembly arrangement comprises at least one anchoring arrangement; said at least one anchoring arrangement comprises a first part, said first part extending from said mounting structure; said at least one anchoring arrangement comprises a second part, said second part disposed at substantially a right angle to said first part; and said second part is disposed in said rubber.

Still another feature of the invention resides broadly in the stove, wherein said rubber is disposed immediately adjacent at least one of the edges of said at least one cooking surface structure.

A further feature of the invention resides broadly in a method for making a stove for cooking food, said stove comprising: a stove body; a cooking hob, said cooking hob comprising at least one cooking surface structure to receive a bottom of a cooking utensil; said cooking hob further comprising at least one cooking element; said at least one cooking element being disposed about said at least one cooking surface structure; said cooking hob further comprising a substantially planar area being disposed about said at least one cooking element; a mounting structure being configured to mount said at least one cooking surface structure; said mounting structure being disposed to surround said at least one cooking surface structure at least in the lower and peripheral area of said at least one cooking surface structure; said mounting structure comprising a molding arrangement injected directly about said at least one cooking surface structure; said mounting structure comprising rubber in contact with said at least one cooking surface structure; and said mounting structure being connected to said cooking hob to hold said at least one cooking surface structure on said cooking hob; and said method comprising the steps of: molding said mounting structure onto said at least one cooking surface structure by injecting rubber about said at least one cooking surface structure; mounting said at least one cooking surface structure in said hob; and mounting said cooking hob on said stove.

Another feature of the invention resides broadly in a method for making a mounting for at least one substantially flat device made of brittle material, such as a hot plate, a cooking surface, a burner structure, a refrigerator shelf, a view window, or a display glass pane, for a major appliance, said method comprising the steps of: molding a mounting structure in a mold onto at least one substantially flat device by injecting silicone rubber about said at least one substantially flat device in said mold to surround said at least one substantially flat device at least in the lower and peripheral area of said at least one substantially flat device; mounting said at least one substantially flat device by said mounting structure in a structure such as a cooking hob.

Yet another feature of the invention resides broadly in the method wherein: said silicone rubber comprises heat-curable two-component liquid silicone rubber; and said step of molding comprises injecting said heat-curable two-component liquid silicone rubber into said mold.

Still another feature of the invention resides broadly in the method wherein connected to said mounting structure is at least one of (a), (b), (c), (d), (e), and (f), where (a), (b), (c), (d), (e), and (f) are the following: (a) at least one hot plate; (b) at least one cooking surface structure; (c) at least one burner structure; (d) at least one refrigerator shelf; (e) at least one view window; and (f) at least one display glass pane.

A further feature of the invention resides broadly in the method wherein said method further comprises the step of heat-curing said heat-curable two-component liquid silicone rubber under pressure.

Another feature of the invention resides broadly in a combination of a mounting structure for mounting at least one substantially flat brittle body and at least one substantially flat brittle body, such as a hot plate, a cooking surface structure, a burner structure, a refrigerator shelf, a view window, or a glass pane, for a major appliance, said combination comprising: a structure being disposed about at least one substantially flat brittle body for mounting said at least one substantially flat brittle body; said mounting structure comprising injected rubber injected about said at least one substantially flat brittle body; and said mounting structure being connected with and surrounding at least the lower and peripheral area of said at least one substantially flat brittle body.

Yet another feature of the invention resides broadly in the combination wherein: said at least one substantially flat brittle body comprises a plurality of substantially flat brittle bodies; said mounting structure comprises injected rubber injected about said plurality of substantially flat brittle bodies and connected to and surrounding at least the lower and peripheral area of at least one of said plurality of substantially flat brittle bodies; and said plurality of substantially flat brittle bodies are disposed adjacent one another.

Still another feature of the invention resides broadly in the combination wherein said mounting structure is disposed adjacent at least one side of at least one of said plurality of substantially flat brittle bodies.

A further feature of the invention resides broadly in the combination wherein at least one support arrangement is disposed generally under said mounting structure; said at least one support arrangement is disposed to support said mounting structure; said mounting structure further comprises at least one assembly arrangement for permitting mounting of said mounting structure; and said at least one assembly arrangement is at least partly disposed in and non-detachably connected to said at least one support arrangement.

Another feature of the invention resides broadly in the combination wherein: said at least one assembly arrangement comprises at least one anchoring arrangement; said at least one anchoring arrangement comprises a first part, said first part extending from said mounting structure; said at least one anchoring arrangement comprises a second part, said second part disposed at substantially a right angle to said first part; and said second part is disposed in said rubber.

Still another feature of the invention resides broadly in the combination wherein: said mounting structure comprises at least one cooking element and at least one function arrangement, said function arrangement comprising at least one of (a) and (b), where (a) and (b) are the following: (a) at least one control apparatus; and (b) at least one display apparatus.

One feature of the invention resides broadly in the method for the production of a mounting for essentially flat moldings that are made of brittle material, which mounting surrounds the molding at least in the lower and lateral peripheral area, whereby the molding is inserted and positioned in a heatable injection mold with at least two cavity plates and the predetermined shape of the cavity plates determines the shape and orientation of the mounting with respect to the molding, characterized by the fact that after the injection mold is closed, addition-crosslinkable (hot-curable) two-component liquid silicone rubber is injected and hot-cured under pressure.

Another feature of the invention resides broadly in the method characterized by the fact that a plurality of moldings are placed and positioned in the injection mold, whereby the predetermined shape of the cavity plates determines the shape and orientation of the mounting with respect to the moldings and the orientation of the moldings with respect to one another.

Yet another feature of the invention resides broadly in the method characterized by the fact that the liquid silicone rubber is injected into the closed injection mold using an injection molding machine and the Liquid Injection Molding (LIM) method.

Still another feature of the invention resides broadly in the method characterized by the fact that the liquid silicone rubber is injected at a pressure of 100 to 200 bar at a temperature within the range of approximately 20 degrees Celsius to approximately 30 degrees Celsius.

A further feature of the invention resides broadly in the method characterized by the fact that the liquid silicone rubber is cross linked within a temperature range of approximately 140 degrees Celsius to approximately 20 degrees Celsius, whereby the curing time (vulcanization time) is within a range of approximately 3 seconds to approximately 7 seconds per millimeter of wall thickness of the mounting.

Another feature of the invention resides broadly in the method characterized by the fact that the cavity plates are realized so that the resulting mounting has a supporting segment which is engaged underneath the molding on its underside, whereby assembly aids are introduced and positioned in the cavity plates if necessary, so that they are at least partly embedded in the resulting supporting segment and are non-detachably connected with it.

Yet another feature of the invention resides broadly in the method characterized by the fact that moldings made of glass ceramic are used.

Still another feature of the invention resides broadly in the method characterized by the fact that the assembly aid has anchoring means, in particular anchoring means that extends at right angles to the direction of the principal load acting on the assembly aid.

A further feature of the invention resides broadly in the method characterized by the fact that the cavity plates are realized so that the resulting mounting forms an edge-protector for the molding.

Another feature of the invention resides broadly in the method characterized by the fact that moldings made of glass, in particular soda-lime glass, borosilicate glass, or alumosilicate glass are used.

Yet another feature of the invention resides broadly in the method characterized by the fact that moldings made of glass ceramic are used.

Still another feature of the invention resides broadly in the method characterized by the fact that moldings made of ceramic, in particular ceramic that contains SiC, $Si_3N_4$ or $Al_2O_3$, are used.

A further feature of the invention resides broadly in the method characterized by the fact that hot plates, cooking surfaces, hob tops, refrigerator shelves, view windows and display glass panes are connected directly with the mounting.

Another feature of the invention resides broadly in the method characterized by the fact that at least one cooking surface and at least one function zone are directly connected with the mounting, whereby the function zone may also contain control and/or display elements.

Yet another feature of the invention resides broadly in the mounting for essentially flat moldings made of brittle material, whereby the mounting surrounds the molding at least in the lower and peripheral area and is injected directly onto the molding and is connected with the molding, characterized by the fact that the mounting is made of temperature-resistant, addition-crosslinked (hot-cured) two-component silicone rubber.

Still another feature of the invention resides broadly in the mounting characterized by the fact that the mounting is injected directly onto a plurality of moldings, whereby the moldings are connected to one another by means of the mounting.

A further feature of the invention resides broadly in the mounting characterized by the fact that the mounting forms an edge-protector for the molding.

Another feature of the invention resides broadly in the mounting characterized by the fact that the mounting may have a supporting segment with assembly aids, whereby the supporting segment is engaged underneath the molding on its underside.

Yet another feature of the invention resides broadly in the mounting characterized by the fact that the assembly aid projects at right angles from the molding.

Still another feature of the invention resides broadly in the mounting characterized by the fact that the assembly aid has anchoring means, in particular anchoring means which extend at right angles to the direction of the main load acting on the assembly aid.

A further feature of the intention resides broadly in the mounting characterized by the fact that the mounting surrounds at least one molding that is made of glass, in particular soda-lime glass, borosilicate glass, or alumosilicate glass.

Another feature of the invention resides broadly in the mounting characterized by the fact that the mounting surrounds at least one molding that is made of glass ceramic.

Yet another feature of the invention resides broadly in the mounting characterized by the fact that the mounting surrounds at least one molding that is made of ceramic, in particular ceramic containing SiC, $Si_3N_4$ or $Al_2O_3$.

Still another feature of the invention resides broadly in the mounting characterized by the fact that the mounting forms the installation frame of a molding.

A further feature of the invention resides broadly in the mounting characterized by the fact that the mounting surrounds cooking surfaces, cooking zones, hob tops, refrigerator shelves, view windows, and display glass panels.

Another feature of the invention resides broadly in the mounting characterized by the fact that the mounting connects at least one cooking surface and at least one function zone, whereby the function zone can also be associated with control and/or display elements.

Some examples of ceramic materials that may possibly be utilized or adapted for use in at least one possible embodiment of the present invention may be found in the following U.S. patents: U.S. Pat. No. 5,385,873, issued on Jan. 31, 1995; U.S. Pat. No. 5,407,740, issued on Apr. 18, 1995; U.S. Pat. No. 5,420,399, issued on May 30, 1995; U.S. Pat. No. 5,422,319, issued on Jun. 6, 1995; U.S. Pat. No. 5,449,649, issued on Sep. 12, 1995; U.S. Pat. No. 5,476,684, issued on Dec. 19, 1995; and U.S. Pat. No. 5,691,261, issued on Nov. 25, 1997.

Some examples of ceramic plates or hot plates that may possibly be utilized or adapted for use in at least one possible embodiment of the present invention may be found in the following U.S. patents: U.S. Pat. No. 3,596,650, issued on Aug. 3, 1971; U.S. Pat. No. 3,870,861, issued on Mar. 11, 1975; U.S. Pat. No. 4,414,465, issued on Nov. 8, 1983; U.S. Pat. No. 4,634,841, issued on Jan. 6, 1987; and U.S. Pat. No. 5,397,873, issued on Mar. 14, 1995.

Some examples of cooking hobs or cooktops that may possibly be utilized or adapted for use in at least one possible embodiment of the present invention may be found in the following U.S. patents: U.S. Pat. No. 5,679,273, issued on Oct. 21, 1997; U.S. Pat. No. 5,406,932, issued on Apr. 18, 1995; U.S. Pat. No. 5,422,460, issued on Jun. 6, 1995; U.S. Pat. No. 5,424,512, issued on Jun. 13, 1995; U.S. Pat. No. 5,425,353, issued on Jun. 20, 1995; U.S. Pat. No. 5,429,114, issued on Jul. 4, 1995; and U.S. Pat. No. 5,448,036, issued on Sep. 5, 1995.

Some examples of adhesive materials that may possibly be utilized or adapted for use in at least one possible embodiment of the present invention may be found in the following U.S. patents: U.S. Pat. No. 5,225,662, issued on Jul. 6, 1993; U.S. Pat. No. 5,268,338, issued on Dec. 7, 1993; U.S. Pat. No. 5,288,674, issued on Feb. 22, 1994; U.S. Pat. No. 5,300,627, issued on Apr. 5, 1994; U.S. Pat. No. 5,403,228, issued on Apr. 4, 1995; U.S. Pat. No. 5,432,320, issued on Jul. 11, 1995; U.S. Pat. No. 5,468,290, issued on Nov. 21, 1995; and U.S. Pat. No. 5,475,044, issued on Dec. 12, 1995.

Some further examples of cooktops that may possibly be utilized or adapted for use in at least one possible embodiment of the present invention may be found in the following U.S. patent applications: U.S. Pat. No. 6,021,774, issued on Feb. 8, 2000; U.S. Pat. No. 6,002,112, issued on Dec. 14, 1999; Ser. No. 09/177,336, having Attorney Docket No. SCT-04 US, allowed on Oct. 25, 1999, filed on Oct. 22, 1998, entitled "COOKING APPLIANCE SUCH AS A STOVE WITH AN ARRANGEMENT FOR A CERAMIC HEATING ELEMENT AS A COOKING ZONE IN A CUT-OUT OF A COOKING SURFACE", having inventor Bernd Schultheis, which claims priority from German Patent Publication P 197 46 844.6, which was filed on Oct. 23, 1997; Ser. No. 09/176,981, Attorney Docket No. SCT-05 US, allowed on Jun. 21, 1999, filed on Oct. 22, 1998, entitled "ARRANGEMENT OF A HOT PLATE IN A COOK TOP", having inventors Bernd Schultheis and Martin Taplan, which claims priority from German Patent Publication P 197 46 845.4, filed on Oct. 23, 1997; and Ser. No. 09/364,479, Attorney Docket No. SCT-04 US, filed on Jul. 30, 1999, entitled "LEAD- AND CADMIUM-FREE GLASS COMPOSITION FOR GLAZING, ENAMELLING AND DECORATING GLASSES OR GLASS-CERAMICS, AND PROCESS FOR THE PRODUCTION OF A GLASS-CERAMIC COATED THEREWITH", having the inventors Ina Mitra, Dr. Friedrich Siebers, Dr. Jutta Reichert, Dr. Cora Krause, Dr. Otmar Becker, and Dr. Michael Bug, which claims priority from German Patent Publication DE 198 34 801.0-45, filed on Aug. 1, 1998.

Some examples of stoves and ranges that may possibly be utilized or adapted for use at least one possible embodiment of the present invention may be found in the following U.S. patents: U.S. Pat. No. 5,213,091, issued on May 25, 1993; U.S. Pat. No. D336,210, issued on Jun. 8, 1993; U.S. Pat. No. 5,280,152, issued on Jan. 18, 1994; U.S. Pat. No. 5,290,997, issued on Mar. 1, 1994; U.S. Pat. No. 5,400,765, issued on Mar. 28, 1995; U.S. Pat. No. D359,345, issued on Jun. 13, 1995; U.S. Pat. No. D361,015, issued on Aug. 8, 1995; and U.S. Pat. No. 5,464,005, issued on Nov. 7, 1995.

Some examples of burners and related components that may possibly be utilized or adapted for use in at least one possible embodiment of the present invention may be found in the following U.S. patents: U.S. Pat. No. 4,758,710, issued on Jul. 19, 1988; U.S. Pat. No. 4,899,723, issued on Feb. 13, 1990; U.S. Pat. No. 5,186,158, issued on Feb. 16, 1993; U.S. Pat. No. D333,943, issued on Mar. 16, 1993; U.S.

Pat. No. 5,323,759, issued on Jun. 28, 1994; U.S. Pat. No. 5,329,918, issued on Jul. 19, 1994; U.S. Pat. No. 5,397,234, issued on Mar. 14, 1995; U.S. Pat. No. 5,397,873, issued on Mar. 14, 1995; U.S. Pat. No. 5,400,765, issued on Mar. 28, 1995; and U.S. Pat. No. 5,437,262, issued on Aug. 1, 1995.

Some examples of related components for stoves and ranges that may possibly be utilized or adapted for use in at least one possible embodiment of the present invention may be found in the following U.S. patents: U.S. Pat. No. 5,220,155, issued on Jun. 15, 1993; U.S. Pat. No. 5,245,159, issued on Sep. 14, 1993; U.S. Pat. No. 5,343,020, issued on Aug. 30, 1994; U.S. Pat. No. 5,377,660, issued on Jan. 3, 1995; U.S. Pat. No. 5,380,985, issued on Jan. 10, 1995; and U.S. Pat. No. 5,400,766, issued on Mar. 28, 1995.

Some examples of molds, molding processes, injection methods, vulcanization methods, and machines for use therewith that may possibly be utilized or adapted for use in at least one possible embodiment of the present invention may be found in the following U.S. patents: U.S. Pat. No. 6,005,052, issued on Dec. 21, 1999; U.S. Pat. No. 5,981,610, issued on Nov. 9, 1999; U.S. Pat. No. 5,944,324, issued on Aug. 31, 1999; U.S. Pat. No. 5,885,386, issued on Mar. 23, 1999; U.S. Pat. No. 5,798,127, issued on Aug. 25, 1998; U.S. Pat. No. 5,743,027, issued on Apr. 28, 1998; U.S. Pat. No. 5,733,493, issued on Mar. 31, 1998; U.S. Pat. No. 5,610,230, issued on Mar. 11, 1997; U.S. Pat. No. 5,607,992, issued on Mar. 4, 1997; U.S. Pat. No. 5,605,707, issued on Feb. 25, 1997; U.S. Pat. No. 5,580,587, issued on Dec. 3, 1996; U.S. Pat. No. 5,577,314, issued on Nov. 26, 1996; U.S. Pat. No. 5,564,714, issued on Oct. 15, 1996; U.S. Pat. No. 5,513,115, issued on Apr. 30, 1996; U.S. Pat. No. 5,447,976, issued on Sep. 5, 1995; U.S. Pat. No. 5,418,065, issued on May 23, 1995; U.S. Pat. No. 5,366,805, issued on Nov. 22, 1994; U.S. Pat. No. 5,200,208, issued on Apr. 6, 1993; U.S. Pat. No. 5,110,281, issued on May 5, 1992; U.S. Pat. No. 5,122,398, issued on Jun. 16, 1992; U.S. Pat. No. 4,875,849, issued on Oct. 24, 1989; U.S. Pat. No. 4,708,633, issued on Nov. 24, 1987; U.S. Pat. No. 4,410,478, issued on Oct. 18, 1983; U.S. Pat. No. 4,382,057, issued on May 3, 1983; U.S. Pat. No. 4,334,847, issued on Jun. 15, 1982; U.S. Pat. No. 4,333,901, issued on Jun. 8, 1982; and U.S. Pat. No. 4,300,970, issued on Nov. 17, 1981.

Some further examples of liquid injection molding processes, apparatus, and compositions and materials therefor that may possibly be utilized or adapted for use in at least one possible embodiment of the present invention may be found in the following U.S. patents: U.S. Pat. No. 6,015,853, issued on Jan. 18, 2000; U.S. Pat. No. 5,948,339, issued on Sep. 7, 1999; U.S. Pat. No. 5,677,411, issued on Oct. 14, 1997; U.S. Pat. No. 5,616,632, issued on Apr. 1, 1997; and U.S. Pat. No. 5,563,211, issued on Oct. 8, 1996.

Some examples of types of rubber or other elastomers that may possibly be utilized or adapted for use in at least one possible embodiment of the present invention may be found in the following U.S. patents: U.S. Pat. No. 6,005,052, issued on Dec. 21, 1999; U.S. Pat. No. 5,981,610, issued on Nov. 9, 1999; U.S. Pat. No. 5,885,386, issued on Mar. 23, 1999; U.S. Pat. No. 5,743,027, issued on Apr. 28, 1998; U.S. Pat. No. 5,733,493, issued on Mar. 31, 1998; U.S. Pat. No. 5,610,230, issued on Mar. 11, 1997; U.S. Pat. No. 5,607,992, issued on Mar. 4, 1997; U.S. Pat. No. 5,577,314, issued on Nov. 26, 1996; U.S. Pat. No. 5,564,714, issued on Oct. 15, 1996; U.S. Pat. No. 5,447,976, issued on Sep. 5, 1995; U.S. Pat. No. 5,418,065, issued on May 23, 1995; U.S. Pat. No. 5,366,805, issued on Nov. 22, 1994; U.S. Pat. No. 5,310,811, issued on May 10, 1994; U.S. Pat. No. 5,284,890, issued on Feb. 8, 1994; U.S. Pat. No. 5,122,398, issued on Jun. 16, 1992; U.S. Pat. No. 5,082,886, issued on Jan. 21, 1992; U.S. Pat. No. 4,902,738, issued on Feb. 20, 1990; U.S. Pat. No. 4,866,127, issued on Sep. 12, 1989; U.S. Pat. No. 4,708,633, issued on Nov. 24, 1987; U.S. Pat. No. 4,410,478, issued on Oct. 18, 1983; U.S. Pat. No. 4,382,057, issued on May 3, 1983; U.S. Pat. No. 4,350,795, issued on Sep. 21, 1982; U.S. Pat. No. 4,334,847, issued on Jun. 15, 1982; U.S. Pat. No. 4,333,901, issued on Jun. 8, 1982; U.S. Pat. No. 4,300,970, issued on Nov. 17, 1981; U.S. Pat. No. 4,239,862, issued on Dec. 16, 1980; and U.S. Pat. No. 3,963,647, issued on Jun. 15, 1976.

Some examples of resistors printed on or disposed on a ceramic material that may possibly be utilized or adapted for use in at least one possible embodiment of the present invention may be found in the following U.S. patents: U.S. Pat. No. 4,004,130, issued on Jan. 18, 1977; U.S. Pat. No. 4,160,897, issued on Jul. 10, 1979; U.S. Pat. No. 4,762,982, issued on Aug. 9, 1988; U.S. Pat. No. 5,264,681, issued on Nov. 23, 1993; and U.S. Pat. No. 5,700,338, issued on Dec. 23, 1997.

Some examples of thermally insulating materials that may possibly be utilized or adapted for use in at least one possible embodiment of the present invention may be found in the following U.S. patents: U.S. Pat. No. 5,408,832, issued on Apr. 25, 1995; U.S. Pat. No. 5,420,401, issued on May 30, 1995; U.S. Pat. No. 5,449,232, issued on Sep. 12, 1995; U.S. Pat. No. 5,456,682, issued on Oct. 10, 1995; and U.S. Pat. No. 5,469,683, issued on Nov. 28, 1995.

German Patent No. 30 49 491 C2, German Patent No. 42 27 672 C2, French Patent No. 2 626 964, European Patent No. 0 069 298 B1 and German Patent Application No. 197 05 715.2-16 are hereby incorporated as if set forth in their entirety herein.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the present invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 199 10 467.0-16, filed on Mar. 10, 1999, having inventors Dipl.-Ing. Michael Muskalla, Dipl.-Ing. Bernd Schultheis, and Keramik-Ing. Werner Hottum, and DE-OS 199 10 467.0-16 and DE-PS 199 10 467.0-16, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at Applicants' option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the present invention.

What is claimed is:

1. A method for making a mounting for at least one substantially flat device made of brittle material, such as a hot plate, a cooking-surface, a burner structure, a refrigerator shelf, a view window or a display glass pane, for a major appliance, said method comprising the steps of:

molding a mounting structure in a mold onto at least one substantially flat device by injecting hot-curable addition-crosslinkable two-component liquid silicone rubber into said mold about said at least one substantially flat device in said mold to surround said at least one substantially flat device at least in the lower and peripheral area of said at least one substantially flat device;

hot-curing, at a temperature within a range of approximately 140° C. to approximately 200° C., said liquid silicone rubber under pressure in said mold; and mounting said at least one substantially flat device by said mounting structure in a structure such as a cooking hob.

2. The method according to claim 1, wherein connected to said mounting structure is at least one of (a), (b), (c), (d), (e), and (f), where (a), (b), (c), (d), (e), and (f) are the following:

(a) at least one hot plate;

(b) at least one cooking surface structure;

(c) at least one burner structure;

(d) at least one refrigerator shelf;

(e) at least one view window; and (f) at least one display glass pane.

3. The method according to claim 2, wherein:

said mold comprises at least two plates for forming said mounting structure;

each of said at least two plates has a predetermined shape; and said predetermined shape of each of said at least two plates determines the shape of said mounting structure.

4. The method according to claim 1, wherein connected to said mounting structure is at least one of (a), (b), (c), (d), (e), and (f), where (a), (b), (c), (d), (e), and (f) are the following:

(a) at least one hot plate;

(b) at least one cooking surface structure;

(c) at least one burner structure;

(d) at least one refrigerator shelf;

(e) at least one view window; and (f) at least one display glass pane.

* * * * *

UNITED STATES PATENT AND TRADEMARK OFFICE
CERTIFICATE OF CORRECTION

PATENT NO.   : 6,410,891 B1
DATED        : June 25, 2002
INVENTOR(S)  : Michael Muskalla, Bernd Schultheis and Werner Hottum It is certified that error appears in the above-identified patent and that said Letters Patent is hereby corrected as shown below:

Column 1,
Line 13, after "ceramic" insert -- , --.

Column 6,
Line 45, after "an", delete "Additional" and insert -- additional --.

Column 16,
Line 41, after "No.", delete "SCT-04" and insert -- SCT-06 --.

Signed and Sealed this

Third Day of December, 2002

JAMES E. ROGAN
*Director of the United States Patent and Trademark Office*